UNITED STATES PATENT OFFICE.

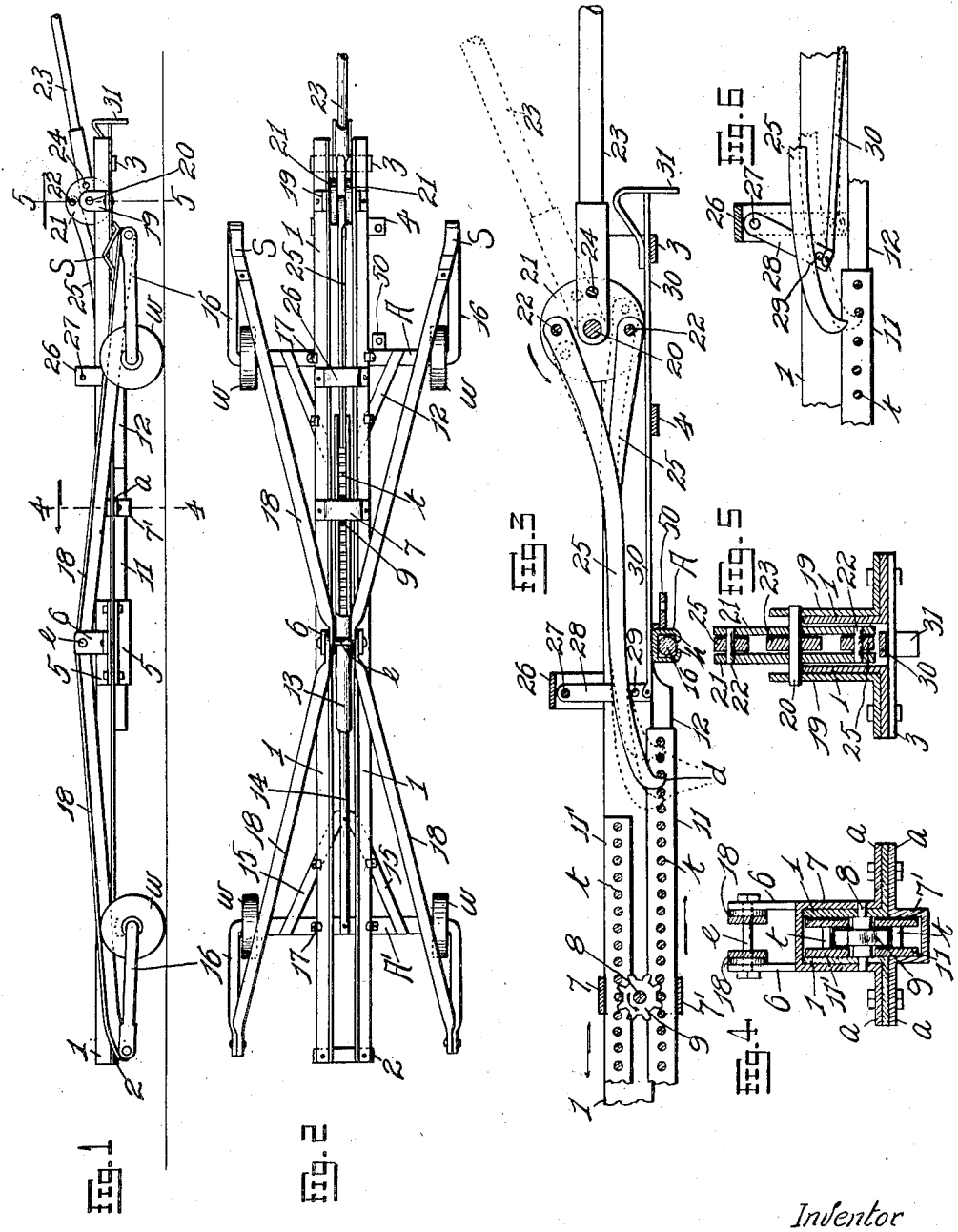

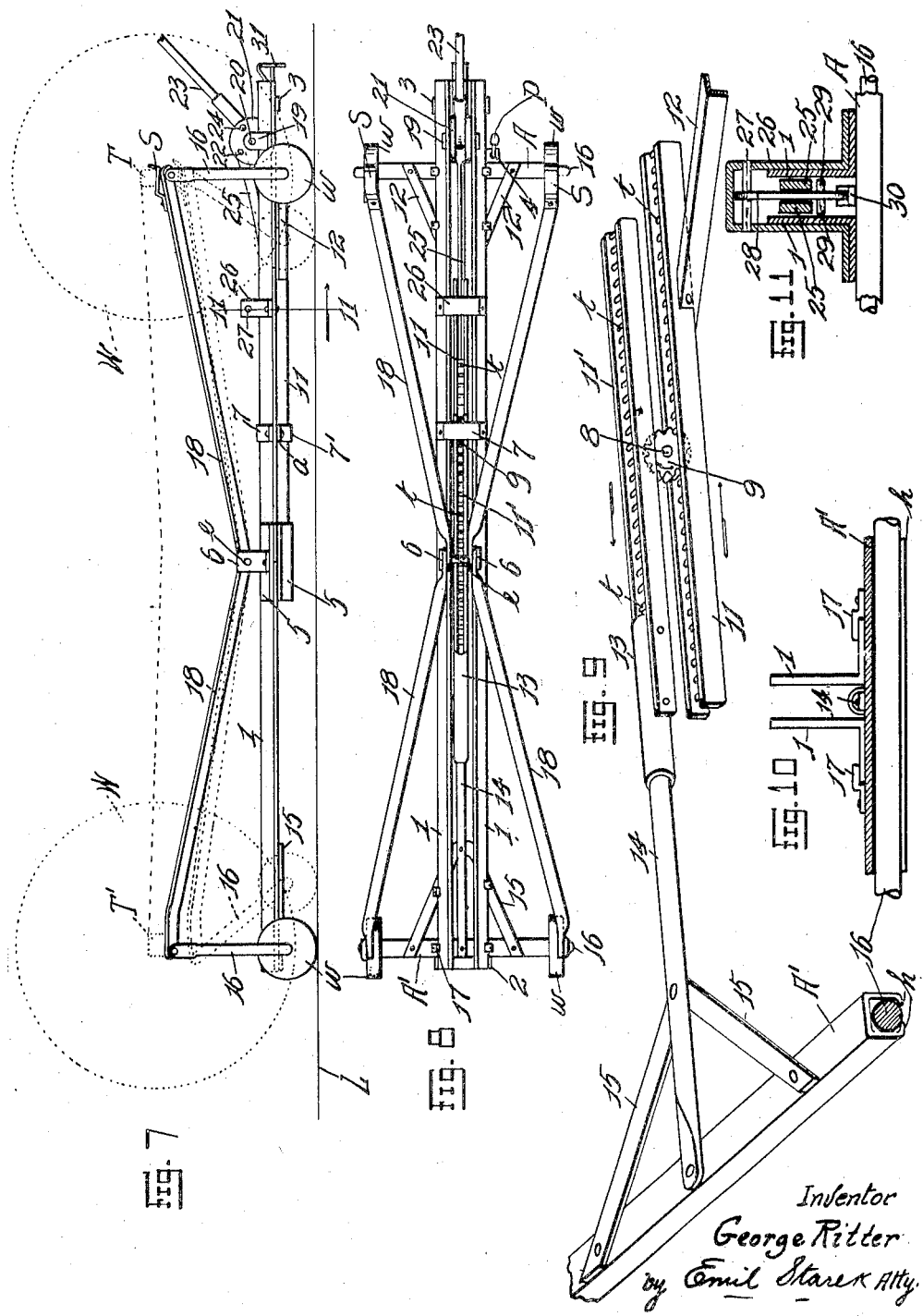

GEORGE RITTER, OF PINCKNEYVILLE, ILLINOIS.

AUTOMOBILE-JACK.

1,359,531.  Specification of Letters Patent.  Patented Nov. 23, 1920.

Application filed March 27, 1920. Serial No. 369,410.

*To all whom it may concern:*

Be it known that I, GEORGE RITTER, a citizen of the United States, residing at Pinckneyville, in the county of Perry, and State of Illinois, have invented certain new and useful Improvements in Automobile-Jacks, of which the following is a full, clear, and exact description, reference being had to the accompanying drawings, forming a part hereof.

The present invention is directed to improvements in automobile jacks, and has for its object to provide a lifting jack for automobiles and vehicles generally, that may be passed under the body of the vehicle and then operated so as to lift the same from the floor thereby causing the wheels at both ends of the vehicle to clear the floor. In the case of automobiles employing pneumatic tires this is a decided advantage as it relieves the tires of the dead weight of the car when not in service. A further object is to provide a jack that is simple in construction, one readily manipulated, one which is strong and rigid, and one presenting further and other advantages better apparent from the following detailed description in connection with the accompanying drawings in which—

Figure 1 represents a side elevation of the jack in its folded or collapsed position; Fig. 2 is a top plan thereof; Fig. 3 is an enlarged vertical middle longitudinal section through the rack-frames and across the front truck bar showing the manner of operation of the hook bars by which the lower rack-frame is actuated; Fig. 4 is an enlarged vertical cross-section on the line 4—4 of Fig. 1 taken opposite the pinion engaging the rack-frames; Fig. 5 is an enlarged vertical cross-section on the line 5—5 of Fig. 1 taken through the actuating disk for the hook-bars; Fig. 6 is a vertical longitudinal sectional detail at right angles to the section 5—5 showing the link to which the kick-bar is coupled; Fig. 7 is a side elevation of the jack when fully unfolded; Fig. 8 is a top plan thereof; Fig. 9 is a perspective detail showing the rack-frames and coupling pole leading from the upper frame to the rear truck bar; Fig. 10 is a vertical sectional detail along either truck-bar showing the manner of guiding the same along the longitudinal rails of the jack; and Fig. 11 is an enlarged vertical cross-section on the line 11—11 of Fig. 7.

Referring to the drawings, 1, 1, represent a pair of guide and supporting rails preferably of angle-bars forming the body of the jack and disposed longitudinally thereof and spaced apart, the rails being connected at the bottom by the terminal cross plates 2, 3, and at an intermediate point by a plate 4. The rails are preferably made in two sections to facilitate shipment, the meeting ends of the sections being connected by plates 5, 5, the latter in turn serving to support the brackets 6, 6 to which reference will be made later on. At a convenient distance from the brackets 6, the rails are connected by a U-shaped strap 7 spanning the tops of the rails, and by a similar strap 7' spanning the bottoms of the rails, the straps being bolted through flanges $a$, $a$, to the horizontal legs of the rails (Fig. 4). Mounted between the rails 1, 1, and substantially midway between the tops and bottoms of the straps 7, 7', about a spindle 8 is a vertically rotatable pinion 9 which meshes with the cross-rods or teeth $t$ of the rack-frames 11, 11' disposed on opposite sides of the pinion, said rack-frames operating as rack-bars and being guided between the rails and maintained against vertical displacement by the straps 7, 7' as clearly obvious from Fig. 4. It will be apparent that by moving one of the rack-frames or bars (11) in one direction it will impart rotation to the pinion 9 which in turn will impart movement to the other rack-bar but in the opposite direction to that of the first rack-bar. One end of the bottom rack-bar 11 is coupled by means of straps 12 to what may be considered as the front truck-bar A, the opposite end of the upper rack-bar being provided with a socket 13 from which leads a coupling pole 14, the latter in turn being connected to the rear truck-bar A' by the straps 15. The truck-bars A, A' are identical in construction, being in the form of channels (Fig. 9) which loosely receive the cross member of an oscillating yoke 16, said member projecting a suitable distance beyond the ends of the truck-bars and supporting the truck rollers or wheels $w$, the arms of the yoke operating as struts and oscillating in vertical planes parallel to the longitudinal plane of disposition of the rails 1, 1. The yokes are prevented from dropping out of the channels of the truck-bars by the inwardly turned lips $h$ bent from the edges of the side walls of the channels (Fig. 9). The truck-bars directly support the rails 1, 1, and are guided along the same by clips 17 engaging the bottom legs of the rails (Fig. 10).

The free or outer ends of the arms of the yokes 16 are pivotally secured to the outer ends of the longitudinal tension members or bars 18, the inner ends of the latter being pivotally coupled (in pairs) to the brackets 6, 6, by means of a pin e.

Secured to the rails 1, 1, at a point exterior to the strap 4 are angle brackets 19 between the vertical legs of which is mounted a spindle 20 of a double disk 21 the two sections of the disk being connected at diametrically opposite points by spindles 22, 22, between which passes the fulcrum end of an operating lever or handle 23 looped about the spindle 20, the handle being coupled to the disks near their outer edges by a pin 24 (Fig. 3). Hinged to the spindles 22 and extending rearwardly between the rails 1, 1, are curved bars 25, 25, bent so as to operate side by side, the free ends of the bars terminating in hooks $d$ which operate as pawls over the teeth $t$ of the bottom rack-frame or rack-bar 11. It will be seen (Fig. 3) that by oscillating the handle 23 so as to impart rotary reciprocations to the double disk 21, one of the hook bars or pawls 25 will seize a tooth $t$ and pull the rack-frame 11 outwardly, while the other hook-bar will ride over the teeth to reach for another tooth and in turn pull the rack-frame with the next stroke of the handle, while the first hook-bar plays freely over the teeth to seize the next tooth, the operation continuing as long as the operator works the handle. As the rack-frame 11 is pulled outwardly or in the direction of the front truck-frame A, it will impart rotation to the pinion 9, the latter in turn pushing or advancing the upper rack-frame 11′ outwardly or in the direction of the truck-bar A′. A reverse or inward movement of the rack-frame 11 will of course cause the rack-frame 11′ to move inwardly, the two frames at all times reciprocating in opposite directions relatively to one another. Spanning the tops of the rails 1 at a point between the strap 7 and plate 4, is a strap 26 across the upper end of which is disposed a spindle 27 from which loosely depends a link or pendant 28, said link hanging between and extending below the hook-bars 25, the lower projecting portion being provided with cross pins 29 normally out of contact with the hook-bars. The lower end of the link 28 is pivotally secured to the inner end of a longitudinally disposed kick-bar 30 which normally rests across the plates 4 and 3, the free end of the bar being provided with a kick plate 31 which limits the inner movement of the bar by coming in contact with the plate 3, as clearly obvious from Fig. 3 of the drawings. By giving the plate 31 a kick so as to push the kick bar 30 inwardly it will cause the link 28 to swing through a sufficient angle to force the pins 29 into engagement with the bottoms of the hook-bars 25, raising the bars sufficiently to bring about a disengagement between the hooks $d$ thereof and the teeth $t$ of the rack-frame 11. Such disengagement causes a collapse of the jack from its unfolded position as will be apparent from a description of the operation of the device which is substantially as follows:

Assuming that the jack is to be used for lifting an automobile, the same is wheeled under the car between the running wheels thereof and the operator then starts to work the handle 23 up and down through short reciprocations (Fig. 3) thereby imparting to the rack-bar 11 periodic advances outwardly or toward the front of the jack, the rack-bar 11′ at the same time being pushed rearwardly. Since the rack-bars are directly coupled to the truck-bars A, A′, through the medium of the straps 12 and 15, the trucks will be forced apart, causing the truck-bars A, A′, to slide along the bottoms of the rails 1, 1, in which outward or separating movement the truck wheels $u$ will travel toward the free ends of the rails. Since the arms of the yoke 16 are secured to the members 18, an oscillating upward movement will be imparted to said arms (the cross members of the yokes freely rotating in the channels of the truck-bars) as clearly obvious from Figs. 1 and 7. In practice, the arms of the yoke are oscillated to an angle of about sixty to sixty-five degrees to the horizontal, when the upper ends of the arms begin to engage the front and rear axles T, T′, of the vehicle, the outer ends of the front members 18 being provided with saddles S for engaging the front axle T. By continuing the reciprocations or strokes of the handle 23 the truck-bars are finally forced to their outermost limits against the plates 2 and 4 by which they are arrested, the arms of the yoke being then substantially vertical. The arms of the yokes in oscillating from the sixty or sixty-five degree angle to vertical position or ninety degree angle raise the automobile sufficiently to lift the wheels W of the car off the ground or floor L as clearly apparent from Fig. 7. The yoke arms obviously act as strut members, while the bars 18 act as tension members. Of course to maintain the parts in their unfolded position (Figs. 7, 8) the rack-bars or frames 11, 11′, must be held against inward movement. Since such a movement is only possible when the upper-rack bar 11′ is free to move inwardly (to the right Fig. 3), and since any tendency to move in that direction is resisted by the hooks $d$ holding the bottom rack-bar 11 against movement inwardly (to the left Fig. 3), it follows that the only condition under which the parts will fold or collapse is when the bottom rack-bar is released from the hook-bars 25.

This is readily accomplished by giving the bar 30 a kick (the operator kicking the plate 31) whereupon the link 28 is oscillated to cause the pins 29 to trip the hook-bars and thereby disengage the same from the teeth t of the rack-bar (Fig. 6). Since the normal tendency of the wheel trucks A, A', under the load resting on the strut arms of the yoke is to roll back toward the center of the rails, it follows that the moment the operator actuates the kick-bar the machine automatically collapses. When in its unfolded position any accidental collapse is prevented by locking the front truck to the rails. For that purpose I provide the truck A with a perforated lug 50 which slips under the projecting perforated end of the plate 4, the perforations being in register with a full unfolding of the parts. The operator then simply passes through said perforations the shackle of a padlock P (Fig. 8) thereby preventing unauthorized tampering with the jack and preventing collapse of the device in case of an accidental kick being imparted to the kick-bar. The structure may of course be modified in many particulars without in any wise affecting the nature or spirit of the invention.

Having described my invention what I claim is—

1. A lifting jack of the character described, comprising longitudinally disposed guide rails, a pair of reciprocable members mounted in proximity thereto, means on the guide rails coöperating with said members for causing the members to move along the rails simultaneously in opposite directions upon actuation of one of the members in a given direction, a pair of wheeled trucks supporting the guide rails and coupled respectively to the reciprocable members aforesaid, a strut member coupled to each truck and oscillating in a vertical plane freely about the axis of the truck, and suitable tension links coupled to the strut members and to the guide rails.

2. A lifting jack of the character described, comprising longitudinally disposed guide rails spaced apart, a pinion inserted between the rails to one side of the center thereof and rotating in a vertical plane, racks engaging the pinion at diametrically and vertically opposite points and reciprocating between the rails, wheeled trucks disposed at opposite ends of the rails and free to slide along the bottoms of the rails, means for coupling the racks each to its respective truck, means for imparting periodic advances to one of the racks in a given direction whereby the opposite rack is caused to advance in the opposite direction and the trucks moved in corresponding directions, strut members at opposite ends of the trucks oscillatable about the axes of the truck wheels, tension links pivotally secured at their inner ends at points substantially at the center of the guide rails, the opposite or outer ends being pivotally connected to the outer ends of the strut members.

3. A lifting jack of the character described, comprising a pair of longitudinally disposed rails spaced apart, a pinion mounted between the rails to one side of the center thereof and rotating in a vertical plane, racks engaging said pinion at diametrically and vertically opposite points and reciprocating between the rails, wheeled trucks supporting the rails and free to slide thereunder, means for coupling the bottom rack to one truck, means for coupling the opposite rack to the opposite truck, a vertically rotatable member at one end of the rails, rack-engaging bars pivotally coupled to said member at diametrically opposite points whereby with a rotation of the member in either direction the rack engaged by said bars will be advanced by one of the bars in a given direction, strut arms oscillating vertically about the axes of the truck wheels, tension bars hinged at the center of the rails and extending in opposite directions, the outer ends of said bars being pivotally secured to the corresponding ends of the strut arms.

4. A lifting jack of the character described, comprising a pair of longitudinally disposed rails spaced apart, a pinion mounted to rotate in a vertical plane between the rails, rack-frames meshing with the top and bottom of the pinion and guided between the rails, transversely disposed wheeled trucks at opposite ends of, and supporting the rails, oscillating strut arms hinged about the axes of the wheels of the trucks, tension links pivotally coupled at their inner ends to the rails at the middle thereof, and at their outer ends to the free ends of the strut arms, a vertically rotatable disk mounted at one end of the rails, a pair of hooked bars pivoted at one end to said disk at diametrically opposite points thereof and extending toward and engaging the rods of the bottom rack-frame, a swinging link suspended above the hooked bars and extending between and below the same, cross pins on the link below the hooked bars, and a kick bar leading from the free end of the link between the rails to a point beyond the disk aforesaid, the parts operating substantially as and for the purpose set forth.

5. In a lifting jack, a body portion, wheeled trucks supporting and slidable along the same to and from one another, tension members hinged to the body at an intermediate point thereof and extending toward the opposite ends of the body, lift arms oscillatable about the axes of the truck wheels and having their outer ends pivotally coupled to the outer ends of the tension members, means for imparting a simultaneous outward movement to the trucks whereby the lift arms are oscillated upwardly and the outer ends of the tension members raised, and means for locking the parts in their raised position.

6. In a lifting jack, a body, trucks supporting the same and movable to and from the center of the body, oscillating lift members coupled to the trucks, and means interposed between the body and the lift members for imparting to the latter an upward sweep with a separating movement of the trucks.

7. In a lifting jack, a pair of parallel reciprocable members, a pair of hook bars reciprocable in the general direction of movement of the members aforesaid and operating alternately with a given stroke to advance one of the members in a given direction and to release said member on the return stroke, and means connecting the members for causing the second member to advance in the opposite direction to the first member, a truck coupled to each member and advanced in a corresponding direction therewith, a body portion supported on the trucks and making sliding contact therewith, oscillating lift arms hinged about the axes of the trucks, and tension members pivotally secured at their ends respectively to the outer ends of the lift arms and to the body portion.

8. In a lifting jack of the character described, a pair of reciprocable rack-frames, a pair of vertically oscillating hook bars hinged at one end and engaging one of the rack-frames with their free ends, a link loosely suspended from a point above the bars and extending to a point below the bars, a kick-bar pivotally secured at one end to the link, means for supporting the free end of the kick-bar, and means on the link for tripping and lifting the hook bars out of engagement with the rack-frame with a kick imparted to the kick-bar in proper direction to oscillate the link from its normal position.

9. A lifting-jack having a body portion, sliding trucks supporting the same, oscillating strut members carried by the trucks, and means for coupling the outer ends of the strut members to the body portion.

In testimony whereof I affix my signature in presence of two witnesses.

GEORGE RITTER.

Witnesses:
MARIE EATON,
JOHN D. ROE.